United States Patent
Ophir et al.

(10) Patent No.: US 12,112,713 B2
(45) Date of Patent: *Oct. 8, 2024

(54) LIQUID CRYSTAL DISPLAY HAVING A ROLLING BACKLIGHT

(71) Applicant: Elbit Systems Ltd., Haifa (IL)

(72) Inventors: Yoav Ophir, Haifa (IL); Gil Benesh, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,656

(22) Filed: May 17, 2021

(65) Prior Publication Data

US 2021/0343254 A1    Nov. 4, 2021

Related U.S. Application Data

(63) Continuation-in-part of application No. 14/917,959, filed as application No. PCT/IL2014/050805 on Sep. 10, 2014, now Pat. No. 11,011,122.

(30) Foreign Application Priority Data

Sep. 10, 2013   (IL) .......................................... 228331

(51) Int. Cl.
   *G09G 3/34* (2006.01)
   *G02B 27/01* (2006.01)
   (Continued)

(52) U.S. Cl.
   CPC ......... *G09G 3/3426* (2013.01); *G02B 27/017* (2013.01); *G06F 3/011* (2013.01);
   (Continued)

(58) Field of Classification Search
   CPC .... G09G 3/342; G09G 3/3426; G09G 3/3666; G09G 3/3688; G09G 3/3648;
   (Continued)

(56) References Cited

U.S. PATENT DOCUMENTS

| | | |
|---|---|---|
| 2005/0007389 A1 | 1/2005 | Kumamoto et al. |
| 2007/0176883 A1* | 8/2007 | Hsu ........................ G09G 3/342 |
| | | 345/102 |
| 2009/0135108 A1 | 5/2009 | Lindfors et al. |
| 2009/0322800 A1 | 12/2009 | Atkins |

(Continued)

*Primary Examiner* — Nitin Patel
*Assistant Examiner* — Cory A Almeida
(74) *Attorney, Agent, or Firm* — PEARL COHEN ZEDEK LATZER BARATZ LLP

(57) ABSTRACT

A head wearable device (HWD) suitable to be worn by a user, the HWD may include: a head tracker configured to track a line of sight (LOS) of the user; a near eye display (NED) comprising: a plurality of transistors groups forming a pixel array of said display, a plurality of backlight units, forming a backlight surface of said display; a backlight control module configured to dim the backlight units that spatially overlap one or more of the transistor groups whenever the data at said transistor groups is being refreshed and further configured to change at least one of: a frequency and a location of the dimmed backlight units; and a computer processor coupled to the tracker and the NED and configured to instruct the backlight control module to change at least one of: the frequency and the location of the dimmed backlight units, based on the user LOS.

20 Claims, 6 Drawing Sheets

(51) Int. Cl.
*G06F 3/01* (2006.01)
*G09G 3/36* (2006.01)
(52) U.S. Cl.
CPC ............. *G06F 3/012* (2013.01); *G09G 3/342* (2013.01); *G09G 3/3648* (2013.01); *G02B 2027/0187* (2013.01); *G09G 2310/024* (2013.01); *G09G 2320/0261* (2013.01); *G09G 2320/0626* (2013.01); *G09G 2354/00* (2013.01)
(58) Field of Classification Search
CPC ... G09G 2320/0261; G09G 2320/0626; G09G 2354/00; G09G 2310/024; G06F 3/012; G06F 3/011; G02B 27/017; G02B 2027/0187
See application file for complete search history.

(56) References Cited

U.S. PATENT DOCUMENTS

| | | | |
|---|---|---|---|
| 2010/0123839 A1* | 5/2010 | Lu | G09G 3/003 345/102 |
| 2010/0283938 A1 | 11/2010 | Chou | |
| 2011/0205251 A1 | 8/2011 | Auld | |
| 2011/0205625 A1 | 8/2011 | Auld | |
| 2011/0249033 A1* | 10/2011 | Oh | G09G 3/3648 345/690 |
| 2011/0267297 A1 | 11/2011 | Yamazaki | |
| 2012/0113498 A1 | 5/2012 | Margerm et al. | |
| 2012/0288139 A1* | 11/2012 | Singhar | G06F 1/3231 382/103 |
| 2013/0141453 A1* | 6/2013 | Devara | G09G 5/10 345/589 |

\* cited by examiner

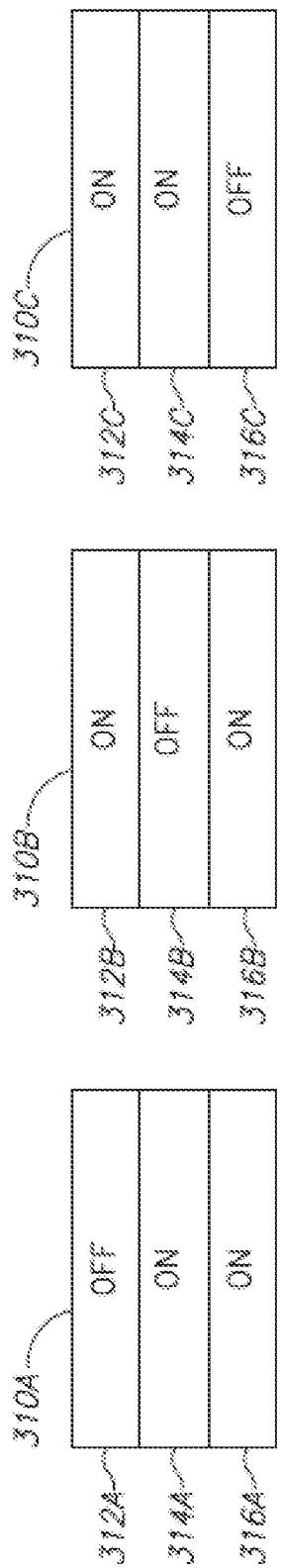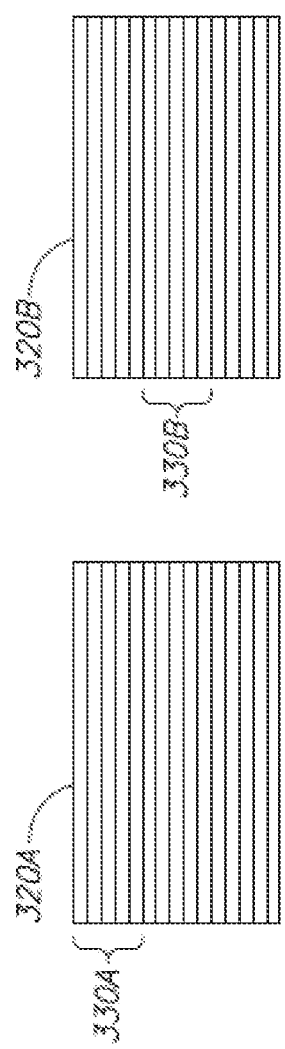
Figure 3A  Figure 3B  Figure 3C

_400_

- 410 — OBTAINING REFRESH DATA FOR UPDATING DATA IN AN LCD DISPLAY COMPRISING AN ARRAY OF GROUPS OF TRANSISTORS

- 420 — PERIODICALLY REFRESHING THE DATA AT THE GROUPS OF TRANSISTORS BASED ON THE OBTAINED REFRESH DATA, WHEREIN THE REFRESHING IS CARRIED PUT IN A PREDEFINED ORDER

- 430 — BACKLIGHTING THE ONE OR MORE OF THE TRANSISTOR GROUPS ONLY WHENEVER THE DATA AT SAID TRANSISTOR GROUPS IS NOT BEING REFRESHED

Figure 4

LIQUID CRYSTAL DISPLAY HAVING A ROLLING BACKLIGHT

CROSS REFERENCE TO RELATED APPLICATIONS

This application is a continuation-in-part of U.S. patent application Ser. No. 14/917,959, filed on Mar. 10, 2016, which is a National Phase Application of PCT International Application No. PCT/IL2014/050805, International Filing Date Sep. 10, 2014, entitled: "LIQUID CRYSTAL DISPLAY HAVING A ROLLING BACKLIGHT", published on Mar. 19, 2015 as International Patent Application Publication No. WO 2015/036996, claiming priority of Israel Patent Application No. 228331, filed Sep. 10, 2013, all of which hereby incorporated by reference in their entirety.

FIELD OF THE INVENTION

The present invention relates to liquid crystal displays and more particularly, to such displays with controllable backlight.

BACKGROUND OF THE INVENTION

Typically, a liquid crystal display (LCD) includes a backlight surface that is configured to produce the backlight that passes through the pixel array which is usually comprised of transistors such as thin film transistors (TFT) and the like. While most LCDs utilize backlight modules that are always being uniformly lit as a single unit, some backlight units are known to be partially lit or locally dimmed, usually based on the data being inputted to the pixels array.

One motivation for local dimming is a case in which a specified region of the display is required to present a very dark (or black) scene, ambiance, or object. By dimming specific backlight units, better representation of the very dark data is achieved. One characteristic of the aforementioned solution is that it is clearly data-aware and the local dimming is carried out based on values of data applied to the pixels upon refreshing.

One known artifact in LCDs is that a backlight which illuminates beyond a specified intensity might photo activate pixel transistors as they as being refreshed. The photo activation may lead to transistors saturation and undesirable results affecting the quality of the image presented.

SUMMARY OF THE INVENTION

According to some embodiments of the present invention, a liquid crystal display (LCD) with controllable backlight is provided herein. The LCD may include a plurality of transistors groups forming a pixel array of said LCD. The transistors groups may be independently controllable. The LCD may further include a plurality of backlight units, forming a backlight surface of said LCD and a data refresh module configured to periodically refresh data at the groups of transistors, at a specified order, over time. The LCD may further include a backlight control module configured to dim the backlight units that spatially overlap one or more of the transistor groups whenever the data at said transistor groups is being refreshed by the data refresh module.

According to another embodiment, the LCD may include: a plurality of transistors groups forming a pixel array of said LCD, wherein the transistors groups are independently controllable; a plurality of backlight units, forming a backlight surface of said LCD, wherein the backlight units are independently controllable; a data refresh module configured to periodically refresh data at said groups of transistors, at a specified order, over a refresh cycle time; and a backlight control module configured to periodically dim the backlight units at said specified order over a backlight cycle time which is substantially shorter than the refresh cycle time.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A-3C are schematic diagrams illustrating several aspects in accordance with some embodiments of the present invention;

FIG. 4 is a high-level flowchart illustrating another aspect in accordance with some embodiments of the present invention;

Figure 1:
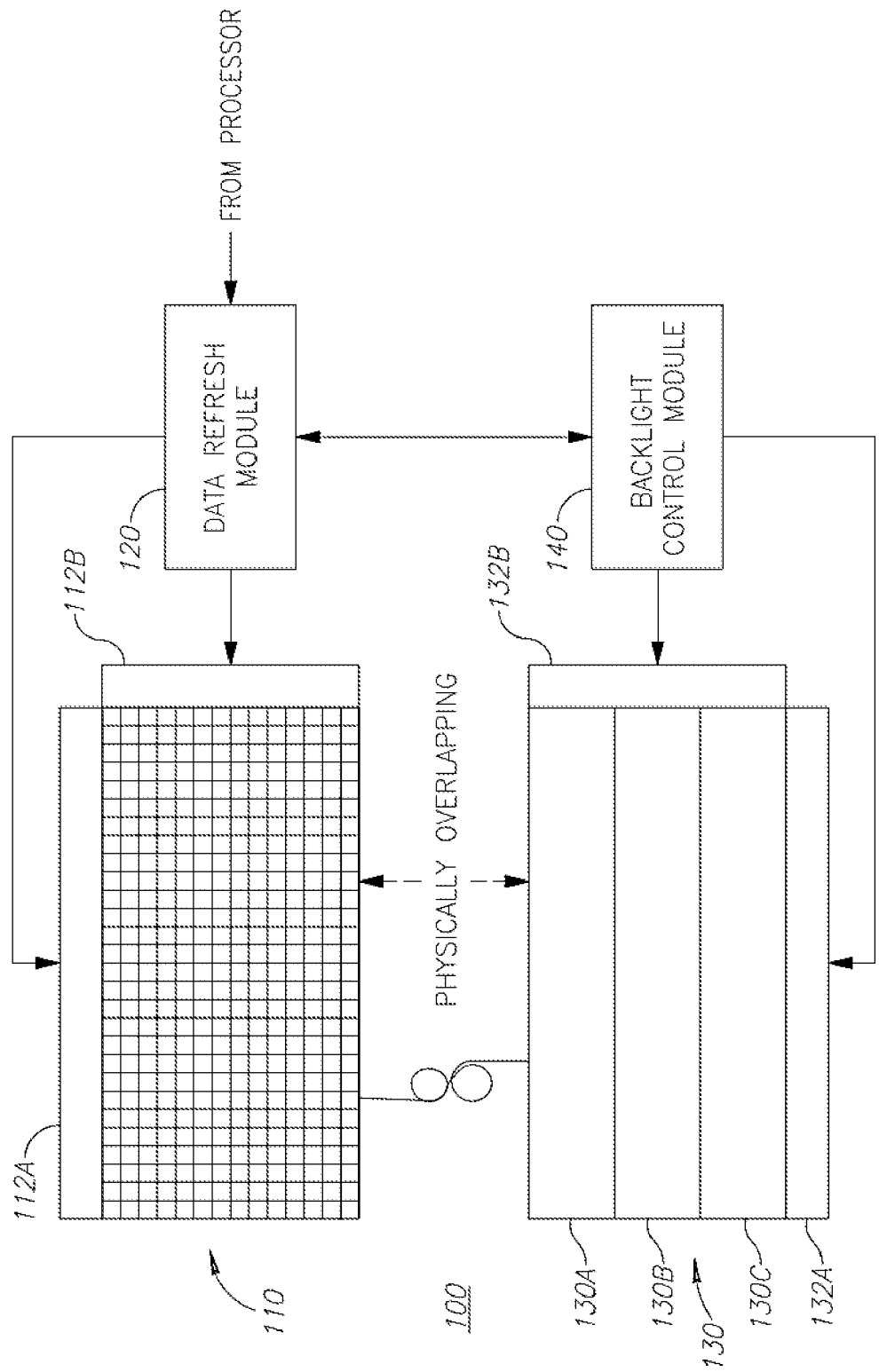
FIG. 1 is a schematic diagram illustrating a system in accordance with some embodiments of the present invention.

The drawings together with the following detailed description make apparent to those skilled in the art how the invention may be embodied in practice.

DETAILED DESCRIPTION OF THE INVENTION

With specific reference now to the drawings in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a schematic diagram illustrating a system in accordance with some embodiments of the present invention. Embodiments of the present invention provide a liquid crystal display (LCD) 100 which may include a plurality of transistors groups forming a pixel array 110 of LCD 100.

The transistors groups may be independently controllable, possibly by drivers 112A and 112B. The LCD may further include a plurality of backlight units such as 130A, 130B, and 130C, forming a backlight surface 130 of LCD 100, being independently controllable, possibly via drivers 132A and 132B. LCD 100 may further include a data refresh module 120 electrically connected to pixel array 110 via drivers 112A and 112B and configured to periodically refresh data at the groups of transistors, at a specified order, over time. Additionally, to the data refresh module whose functionality is present in any currently available electronic display, LCD 100 may further include a backlight control module 140 electrically connected to backlight surface 130 via drivers 132A and 132B and configured to dim backlight units such as 130A, 130B, and 130C that spatially overlap one or more of the transistor groups whenever the data at the transistor groups is being refreshed by data refresh module 120. Advantageously, the likelihood of undesirable photo activation is reduced since the intensity of the backlight that reaches the transistors as they are being updated is reduced.

According to some embodiments of the present invention, the data refreshing is carried out in a predefined refreshing pattern which sets out an order of refreshing the pixels. Similarly, the dimming is carried out in a predefined dimming pattern which sets out an order of dimming the backlight units. Backlight control module 140 may be configured in such a way that the refreshing pattern and the dimming pattern are synchronized so that the dimming pattern follows the refreshing pattern.

According to some embodiments of the present invention, the dimming may include any decrease in the intensity of the light emitted from the dimmed backlight units up to a full switch off. In some alternatives, the dimming may be carried out independently at variable levels so that some units may be dimmed more or less than others. Additionally, at least one of the transistors groups may include one or more transistors.

Figure 2:
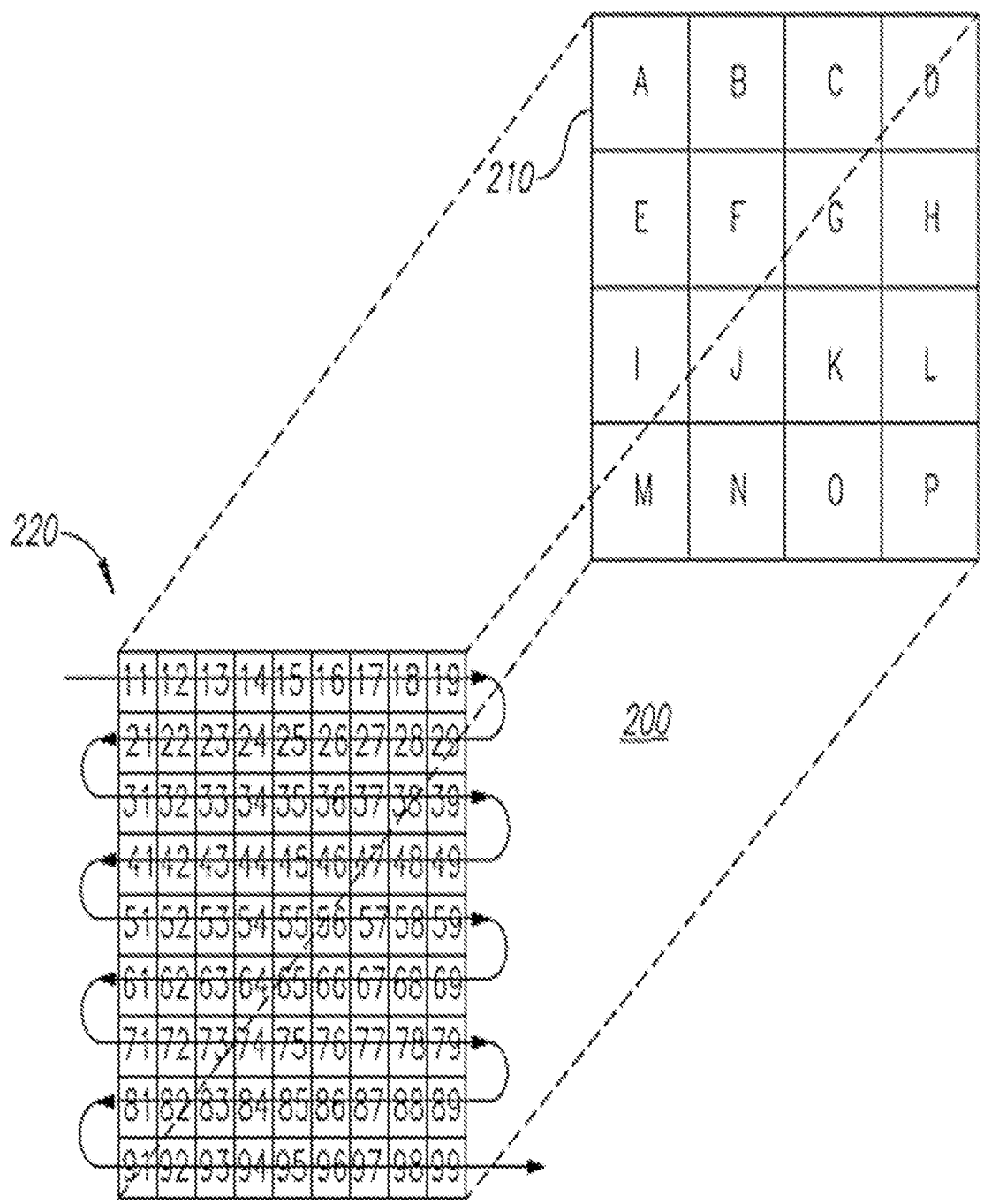
FIG. 2 is a schematic diagram illustrating an aspect in accordance with embodiments of the present invention.

FIG. 2 is a schematic diagram illustrating an aspect in accordance with embodiments of the present invention. LCD layout 200 shows how pixel array 220 may relate to the overlapping backlight module 210. It is noted that the proportion and numbers are for illustration purposes only and should not be regarded as limiting. Backlight module 210 is shown here to have A-P units in a 4×4 configuration (16 all in all) whereas pixel array 220 is illustrated as having 11-99 pixels in a 9×9 configuration (81 all in all). The pixels and the backlight units are interrelated in such a way that some of the pixels are mapped to specific backlight units while other pixels are mapped to other backlight units. In operation, as the pixels are being updated (possibly as shown by the rolling direction of the arrow) the backlight units may be dimmed correspondingly. For example, pixels in rows 11-19 and 21-29 may be associated with backlight units in row A-D and so in operation, whenever data is updated in pixels in rows 11-19 and 21-29, backlight units A-D are dimmed. Similarly, whenever pixels 31-39 and 41-49 are being updated, backlight unit E-H are being dimmed and go forth until all pixels are updated, and another refresh cycle begins. In a typical case where the pixels are being updated in a rolling pattern (as depicted), the backlight units are also "rolling" in their local dimming, but it is understood that any dimming pattern is possible if it follows the refresh pattern of the pixels.

According to some embodiments, the data refresh module may be configured to periodically refresh data at said groups of transistors, at a specified order, over a refresh cycle time. The backlight control module may be configured to periodically dim the backlight units at the specified order as the refresh module but over a backlight cycle time which is substantially shorter than the refresh cycle time. This way, the duration of light that passes through the group of transistors is reduced for each cycle (although the overall luminance is not decreased). This feature is advantageous specifically for moving viewer, such as when the LCD is a micro display integrated within a head mounted display (HMD). With moving viewers, since the refresh rate of the data is usually limited for LCDs, using a higher (e.g. 3 times to 10 times higher) backlight dimming rate, eliminates or reduces the risk of smearing the projected image over the retina of the viewer's eyes. Thus, for example, the dim cycle of backlight units A, B . . . O, P can be carried out in one third of the time that takes to refresh the data along the refresh cycle of transistor groups 11, 12 . . . 98, and 99.

According to some embodiments, the backlight control module may be further synchronized with the data refresh module to dim backlight units whenever transistors groups that are affected by the light of the backlight units are being refreshed. Transistors may be affected by light even if the backlight is not exactly parallel to them and so measurements need to be carried out if photo excitation needs to be avoided at the transistors by stray light of the backlight at the time of data refresh.

According to some embodiments, the backlight control module may be further configured to selectively dim backlight units that are located along borders of the LCD. Advantageously Selectively dimming backlight units A, B, C, D, H, L, P, O, N, M, I, and E being on the border will assist in a case of dark video data to reduce the undesirable haze that may occur where "true black" cannot be achieved due to the nature of LCDs.

FIGS. 3A-3C are schematic diagrams illustrating an aspect in accordance with some embodiments of the present invention. As illustrated, 310A, 310B and 310C show different stages of the backlight unit along the refresh cycle of the pixels, whereas 330A, 330B, and 330C show corresponding stages for the pixel array. Each stage shows which backlight units are dimmed (or OFF) when the pixels are refreshed. For example, in 310A, backlight unit 312A is dimmed and 314A and 316A are turned on since pixels 330A are being refreshed. In 310B, backlight unit 314B is dimmed and 312B and 316B are turned on since pixels 330B are being refreshed. Finally, in 310C, backlight unit 316C is dimmed and 312C and 314C are turned on since pixels 330C are being refreshed. The number of transistors groups being M and the number of backlight units N is typical when N<M. Additionally, the groups of transistors may be arranged in an array of rows and columns and wherein each row is associated with a subset of backlight units, wherein the associated backlight units are turned off whenever the respective row is being refreshed.

FIG. 4 is a high-level flowchart illustrating another aspect in accordance with embodiments of the present invention. Method for backlighting a liquid crystal display (LCD) 400 may include the following stages: obtaining refresh data for updating data in an LCD display comprising an array of groups of transistors 410; periodically refreshing data at the groups of transistors based on the obtained refresh data, wherein the refreshing is carried out in a predefined order 420; and backlighting the one or more of the transistor groups only whenever the data at said transistor groups is not being refreshed 430.

In another embodiment, the method may include the following stages: independently controlling a plurality of transistors groups forming a pixel array of said LCD;

independently controlling a plurality of backlight units, forming together a backlight surface of said LCD; periodically refreshing data at said groups of transistors, at a specified order, over time; and dimming the backlight units that spatially overlap one or more of the transistors groups whenever the data at said transistor groups is being refreshed by said data refresh module.

Figure 5:
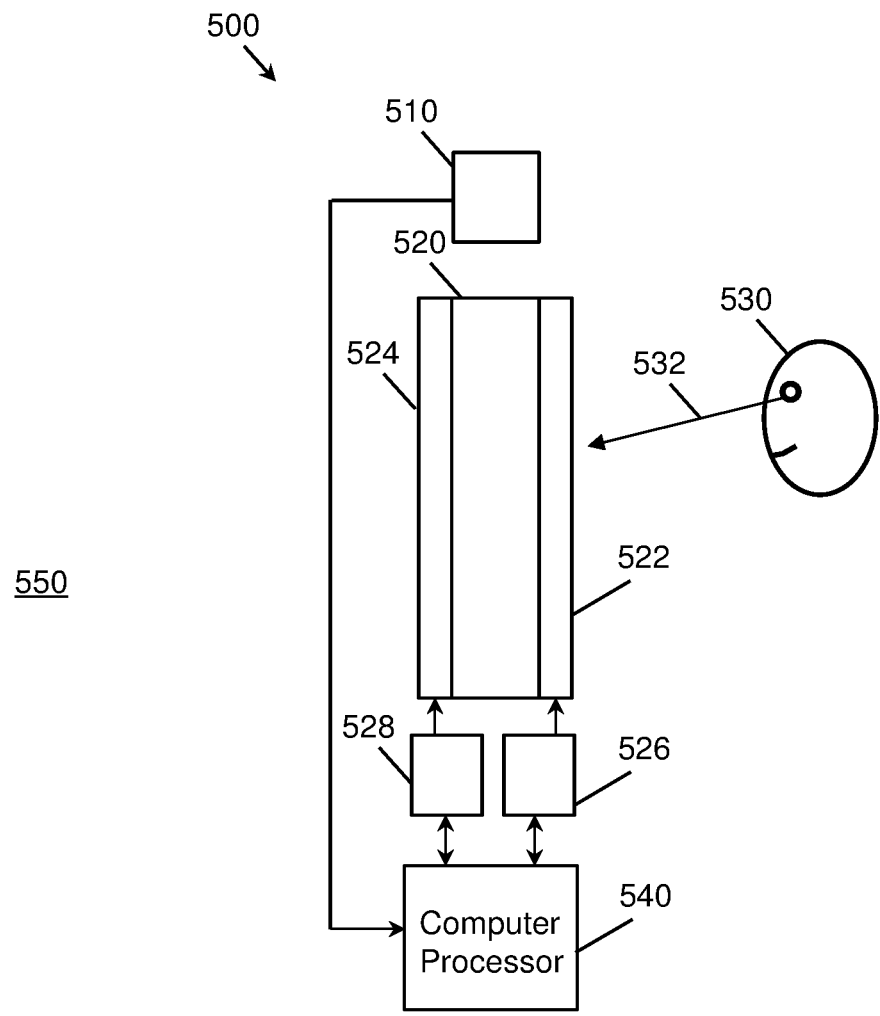
FIG. 5 is a schematic diagram illustrating a system in accordance with some embodiments of the present invention.

FIG. 5 is a schematic diagram illustrating a head wearable device (HWD) 500 in accordance with some embodiments of the present invention. HWD 500 may include a near eye display (NED) 520 suitable to be worn by a user 530. HWD 500 may include: a head tracker 510 (such as a magnetic, inertial, or optical tracker) configured to track a line of sight (LOS) 532 of user 530. NED 520 may include a plurality of transistors groups (not shown) forming a pixel array 522, wherein the transistors groups are independently controllable; a plurality of backlight units (not shown here) forming a backlight surface 524; a data refresh module 526 configured to periodically refresh data at the groups of transistors, at a specified order, over time; and a backlight control module 528 configured to dim the backlight units that spatially overlap one or more of the transistor groups whenever the data at the transistor groups is being refreshed by the data refresh module, wherein the backlight control module 526 is further configured to change at least one of: a frequency and a location of the dimmed backlight units.

HWD 500 may further include a computer processor 540 coupled to the tracker 510 and the NED 522, and configured to receive the LOS of the user and instruct the backlight control module 528 to change at least one of: the frequency and the location of the dimmed backlight units, based on LOS 532 of user 530.

According to some embodiments of the present invention, the user may be human e g a pilot operating a platform e.g. an aircraft in which the HWD serves as a user-platform interface.

According to some embodiments of the present invention, the backlight units may be controlled (specifically the frequency and the location of the dimming) based on dynamics of a head of the user.

According to some embodiments of the present invention, the processor may be configured to increase the frequency of the backlight units whenever the head of the user moves faster.

According to some embodiments of the present invention, processor may be configured to add latency to the backlight synchronization so that the backlight diming starts at a specified delay after the data refreshing, whenever the head of the user moves faster. This may reduce or eliminate smearing pixels over the display whenever the user moves his or her head fast and data is refreshed.

According to some embodiments of the present invention, the backlight units may be controlled based on destinations of the LOS of a head of the user. The knowledge of the LOS may assist in adjusting the dimming frequency accordingly so as to take into consideration the data that is presented at the destination and also the environment and the scene 550 in case that the HWD is a see-through display.

According to some embodiments of the present invention, the computer processor may be configured to refresh the backlight units only in a specific region of the display. This can be advantageous when the user is known to look at a specific destination within its environment such as inside the cockpit (versus at the outside scene).

According to some embodiments of the present invention, the computer processor may be further configured to refresh the backlight units based on scene background 550. This may be advantageous in see-through displays and adjusting the luminance and other properties of the backlight units.

According to some embodiments of the present invention, the computer processor may be further configured to refresh the backlight units based on the data displayed. This is advantageous as a data-aware feature that takes into consideration the displayed data in setting the backlighting. This feature can be used in ether see-though or non-see-through displays.

According to some embodiments of the present invention, the computer processor may be further configured to refresh the backlight units at a high frequency whenever the data displayed comprises video (which requires a higher performance of the backlighting).

According to some embodiments of the present invention, the computer processor may be further configured to refresh the backlight units at a low frequency whenever the data displayed comprises simple symbology.

Figure 6:
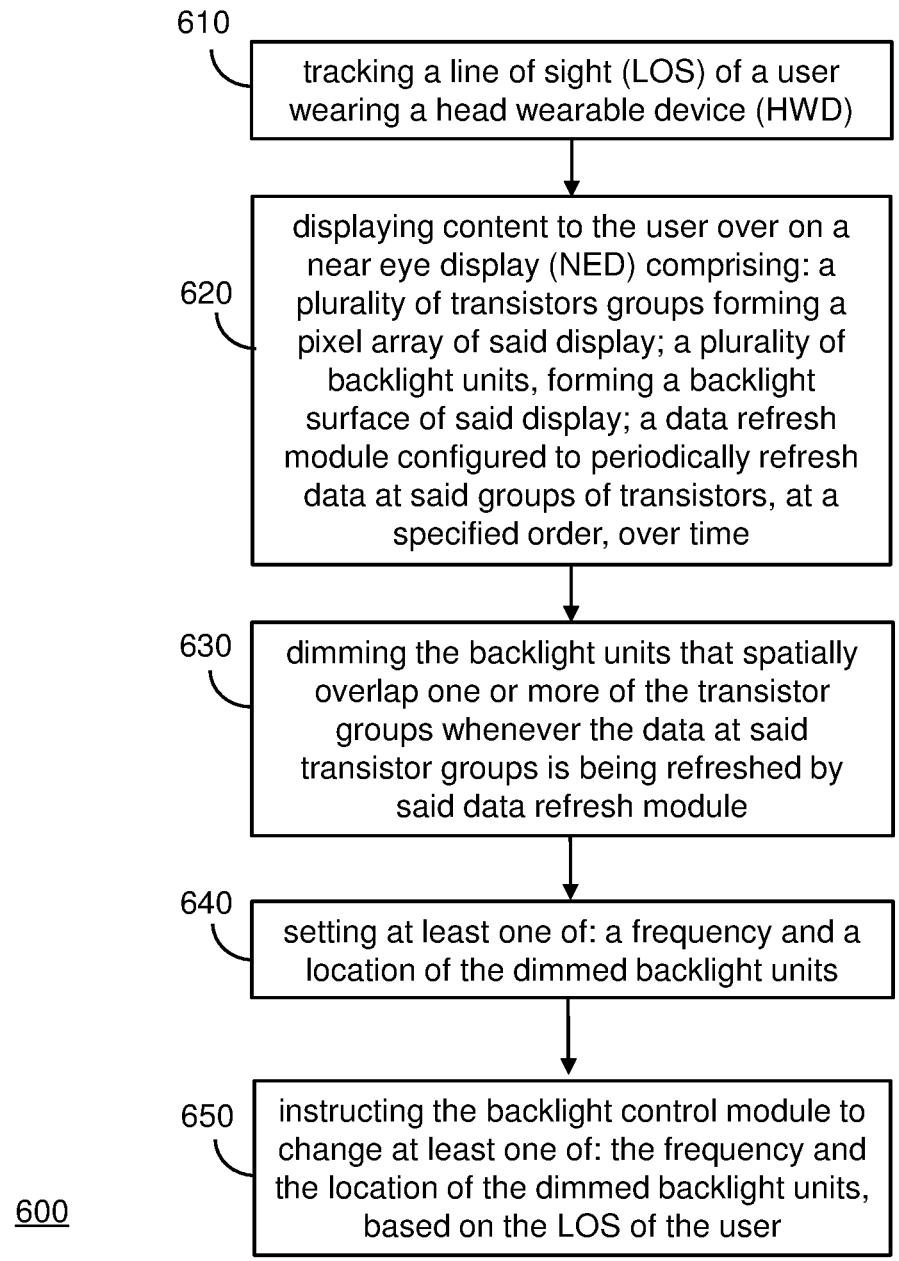
FIG. 6 is a high-level flowchart illustrating another method in accordance with some embodiments of the present invention.

FIG. 6 is a high-level flowchart illustrating another method in accordance with some embodiments of the present invention. A method 600 of controlling a backlight in a head wearable device (HWD) suitable to be worn by a user, may include the following steps: tracking a line of sight (LOS) of the user wearing the HWD 610; displaying content to the user over on a near eye display (NED) comprising: a plurality of transistors groups forming a pixel array of said display; a plurality of backlight units, forming a backlight surface of said display; a data refresh module configured to periodically refresh data at said groups of transistors, at a specified order, over time 620; dimming the backlight units that spatially overlap one or more of the transistor groups whenever the data at said transistor groups is being refreshed by said data refresh module 630; setting at least one of: a frequency and a location of the dimmed backlight units 640; and instructing the backlight control module to change at least one of: the frequency and the location of the dimmed backlight units, based on the LOS of the user 650.

According to some embodiments of the present invention, method 600 may further include increasing the frequency of the backlight units whenever the head of the user moves faster.

According to some embodiments of the present invention, method 600 may further include adding latency to the backlight synchronization so that the backlight diming starts at a specified delay after the data refreshing, whenever the head of the user moves faster.

According to some embodiments of the present invention, method 600 may further include controlling the frequency and the location of the dimming based on destinations of the LOS of a head of the user.

According to some embodiments of the present invention, method 600 may further include comprising controlling the frequency of the dimming at destinations of the LOS of a head of the user based on scene background behind said destinations.

According to some embodiments of the present invention, method 600 may further include controlling the frequency of the dimming at destinations of the LOS of a head of the user based on data displayed at said destinations.

According to some embodiments of the present invention, method 600 may further include setting the dimming of the backlight units to a high frequency whenever a data displayed at a destination of the LOS at the display comprises video.

According to some embodiments of the present invention, method 600 may further include setting the dimming of the backlight units to a low frequency whenever a data displayed at a destination of the LOS at the display comprises simple symbology.

It should be noted that the methods according to some embodiments of the present invention, may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of the aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices.

As will be appreciated by one skilled in the art, aspects of the present invention may be embodied as a system, a method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer program code for carrying out operations for aspects of the present invention may be written in any combination of one or more programming languages, including an object-oriented programming language and conventional procedural programming languages, programming language or similar programming languages. The program code may execute entirely on the user's computer, partly on the user's computer, as a stand-alone software package, partly on the user's computer and partly on a remote computer or entirely on the remote computer or server.

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A head wearable device (HWD) suitable to be worn by a user, said HWD comprising:
   a head tracker configured to track a line of sight (LOS) of the user;
   a near eye display (NED) comprising:
      a plurality of transistors groups forming a pixel array of said display, wherein the transistors groups are independently controllable;
      a plurality of backlight units, arranged in rows and columns forming a backlight surface of said display wherein the backlight units are independently controllable;
      a data refresh system electrically connected to the pixel array via drivers and configured to periodically refresh data at said groups of transistors, at a specified order, over time, being a predefined data refresh pattern; and
      a backlight control system electrically connected to the backlight surface via drivers and configured to dim the backlight units in a predefined dimming pattern, that spatially overlap one or more of the transistor groups whenever the data at said transistor groups is being refreshed by said data refresh system,
      wherein the backlight control system is further configured to change at least one of: a frequency and a location of the dimmed backlight units; and
   a computer processor coupled to the tracker and the NED,
   wherein the computer processor receives the LOS of the user and is further configured to instruct the backlight control system to change at least one of: the frequency and the location of the dimmed backlight units, based on the LOS of the user,
   wherein the computer processor is further configured to instruct the backlight control system to dim the backlight units independently at variable levels, so that some of the backlight units are dimmed more or less than others periodically, and
   wherein the NED is a micro display integrated within the HWD, and operating in a dim-to-refresh ratio in which the specified backlight dimming rate is between 3 times to 10 times higher than the specified refresh rate, and
   wherein said operating in the dim-to-refresh ratio eliminates a smearing of an image projected from the micro display over a retina of an eye of a viewer wearing the HWD, whenever a head of the viewer is moving,
   wherein the backlight control system is configured in such a way, that the data refresh pattern and the dimming pattern are synchronized so that the predefined dimming pattern follows the predefined data refresh pattern.

2. The HWD according to claim 1, wherein the user is operating a platform in which the HWD serves as a user-platform interface.

3. The HWD according to claim 1, wherein the backlight units are controlled based on dynamics of a head of the user.

4. The HWD according to claim 3, wherein the processor is configured to increase the frequency of the backlight units whenever the head of the user moves faster.

5. The HWD according to claim 3, wherein the processor is configured to add latency to the backlight synchronization so that the backlight diming starts at a specified delay after the data refreshing, whenever the head of the user moves faster.

6. The HWD according to claim 1, wherein the backlight units are controlled based on destinations of the LOS of a head of the user.

7. The HWD according to claim 6, wherein the computer processor is configured to refresh the backlight units only in a specific region of the display.

8. The HWD according to claim 6, wherein the computer processor is further configured to refresh the backlight units based on scene background.

9. The HWD according to claim 6, wherein the computer processor is further configured to refresh the backlight units based on the data displayed.

10. The HWD according to claim 9, wherein the computer processor is further configured to refresh the backlight units at a high frequency whenever the data displayed comprises video.

11. The HWD according to claim 9, wherein the computer processor is further configured to refresh the backlight units at a low frequency whenever the data displayed comprises simple symbology.

12. A method of controlling a backlight in a head wearable device (HWD) suitable to be worn by a user, said method comprising:
   tracking a line of sight (LOS) of the user wearing the HWD;
   displaying content to the user over on a near eye display (NED) comprising: a plurality of transistors groups forming a pixel array of said display; a plurality of backlight units, arranged in rows and columns, forming a backlight surface of said display, wherein the backlight units are independently controllable;
   periodically data at said groups of transistors, at a specified order, over time, being a predefined data refresh pattern;
   dimming the backlight units that in a predefined dimming pattern which spatially overlap one or more of the transistor groups whenever the data at said transistor groups is being refreshed;
   setting at least one of: a frequency and a location of the dimmed backlight units; and
   instructing a change at least one of: the frequency and the location of the dimmed backlight units, based on the LOS of the user,
   wherein at least one of: the tracking, the displaying, the dimming, the setting, and the instructing, is controlled by a computer processor,
   wherein the dimming is carried out independently at variable levels so that some of the backlight units are dimmed more or less than others periodically, and
   wherein the NED is a micro display integrated within the HWD, and operating in a dim-to-refresh ratio in which the specified backlight dimming rate is between 3 times to 10 times higher than the specified refresh rate,
   wherein said operating in the dim-to-refresh ratio eliminates a smearing of an image projected from the micro display over a retina of an eye of a viewer wearing the HWD, whenever a head of the viewer is moving, and wherein the data refresh pattern and the dimming pattern are synchronized so that the predefined dimming pattern follows the predefined data refresh pattern.

13. The method according to claim 12, further comprising increasing the frequency of the backlight units whenever the head of the user moves faster.

14. The method according to claim 12, further comprising adding latency to the backlight synchronization so that the backlight diming starts at a specified delay after the data refreshing, whenever the head of the user moves faster.

15. The method according to claim 12, further comprising controlling the frequency and the location of the dimming based on destinations of the LOS of a head of the user.

16. The method according to claim 12, further comprising controlling the frequency of the dimming at destinations of the LOS of a head of the user based on scene background behind said destinations.

17. The method according to claim 12, further comprising controlling the frequency of the dimming at destinations of the LOS of a head of the user based on data displayed at said destinations.

18. The method according to claim 12, further comprising setting the dimming of the backlight units to a high frequency whenever a data displayed at a destination of the LOS at the display comprises video.

19. The method according to claim 12, further comprising setting the dimming of the backlight units to a low frequency whenever a data displayed at a destination of the LOS at the display comprises simple symbology.

20. A non-transitory computer readable medium for controlling a backlight in a head wearable device (HWD) suitable to be worn by a user, the computer readable medium comprising a set of instructions that, when executed, cause at least one computer processor to:

track a line of sight (LOS) of the user wearing the HWD;
display content to the user over on a near eye display (NED) comprising: a plurality of transistors groups forming a pixel array of said display; a plurality of backlight units, arranged in rows and columns forming a backlight surface of said display, wherein the backlight units are independently controllable; said groups of transistors having data periodically refreshed, at a specified order, over time in a predefined data refresh pattern;
dim the backlight units that spatially overlap one or more of the transistor groups whenever the data at said transistor groups is being refreshed;
set at least one of: a frequency and a location of the dimmed backlight units;
instruct a change in at least one of: the frequency and the location of the dimmed backlight units, based on the LOS of the user;
dim the backlight units independently at variable levels, so that some of the backlight units are dimmed more or less than others periodically in a predefined dimming pattern,
wherein the NED is a micro display integrated within the HWD, and operating in a dim-to-refresh ratio in which the specified backlight dimming rate is between 3 times to 10 times higher than the specified refresh rate,
wherein said operating in the dim-to-refresh ratio eliminates a smearing of an image projected from the micro display over a retina of an eye of a viewer wearing the HWD, whenever a head of the viewer is moving; and
wherein the data refresh pattern and the dimming pattern are synchronized so that the predefined dimming pattern follows the predefined data refresh pattern.

* * * * *